United States Patent [19]

Laurencot

[11] Patent Number: 4,951,529
[45] Date of Patent: Aug. 28, 1990

[54] COMBINED TOOL FOR CUTTING AND STRIPPING THE ENDS OF ELECTRICAL WIRES COVERED WITH AN INSULATING SHEATH

[76] Inventor: André Laurencot, L'Aigle -, 25110 Baume les Dames, France

[21] Appl. No.: 414,390

[22] Filed: Sep. 29, 1989

[51] Int. Cl.⁵ .............................................. H02G 1/12
[52] U.S. Cl. .................................................... 81/9.43
[58] Field of Search ........................ 81/9.4, 9.41, 9.43, 81/9.44, 9.42; 30/90.1

[56] References Cited

U.S. PATENT DOCUMENTS 2,995,051  8/1961  Redway .
3,311,001  3/1967  Gallagher et al. .
4,480,509  11/1984  Hydary .

FOREIGN PATENT DOCUMENTS 1515858   4/1969   Fed. Rep. of Germany .
1515888   11/1969  Fed. Rep. of Germany .
2048351   3/1971   France .
2087619   12/1971  France .
2088936   1/1972   France .
2258026   8/1974   France .
552900    8/1974   Switzerland .

Primary Examiner—Roscoe V. Parker
Attorney, Agent, or Firm—Bacon & Thomas

[57] ABSTRACT

This invention relates to a hand tool, characterized in that:

at least one of the levers thereof comprises a jaw disposed opposite a retractable counter-jaw, the lever provided with the gripping jaw is associated with a tool comprising two jaws which are articulated on each other and on said lever, disposed laterally and externally with respect to the gripping jaw and associated with a control member.

The invention is more particularly applicable to tools for cutting and stripping electrical contactors.

13 Claims, 6 Drawing Sheets

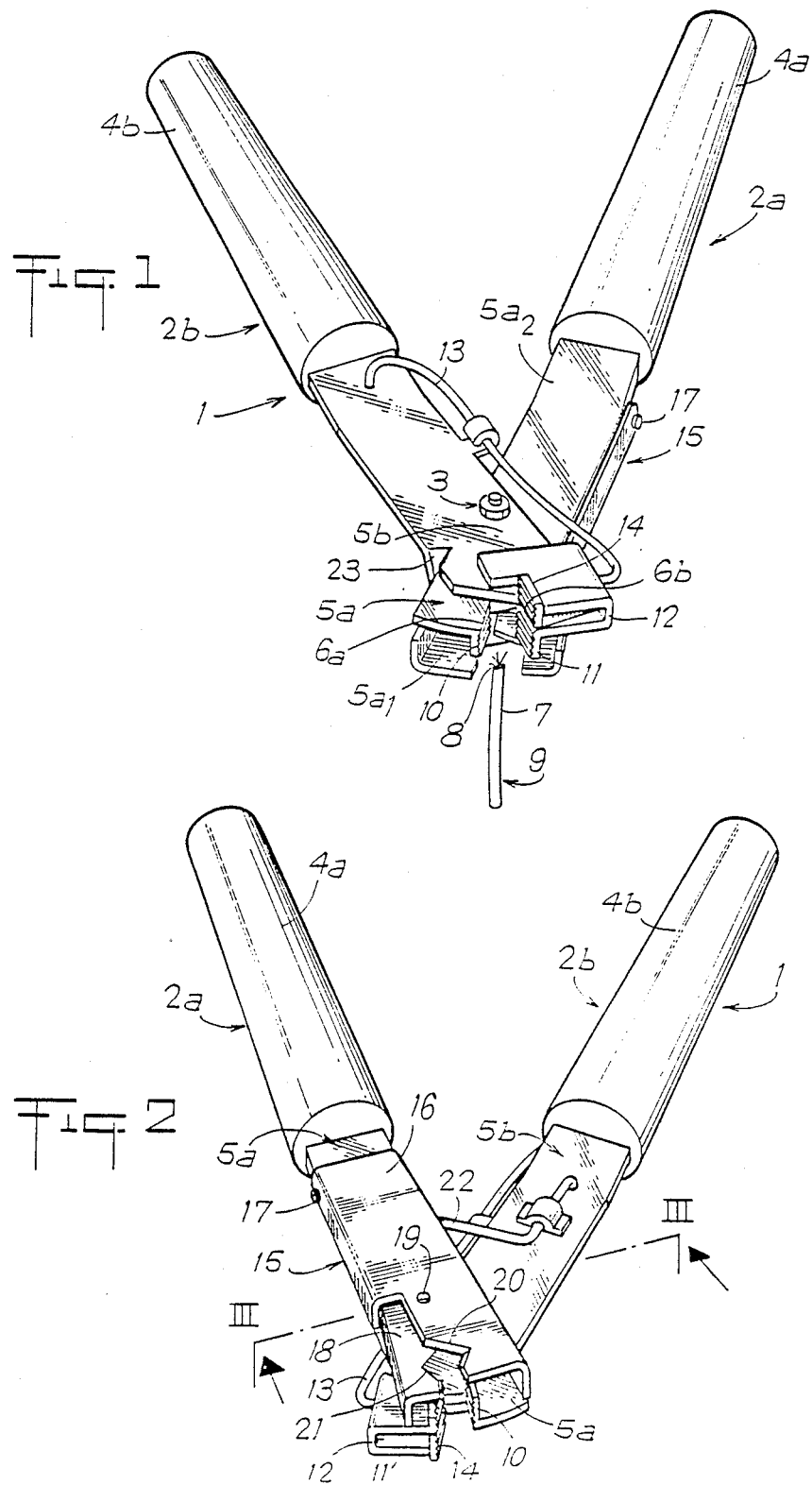

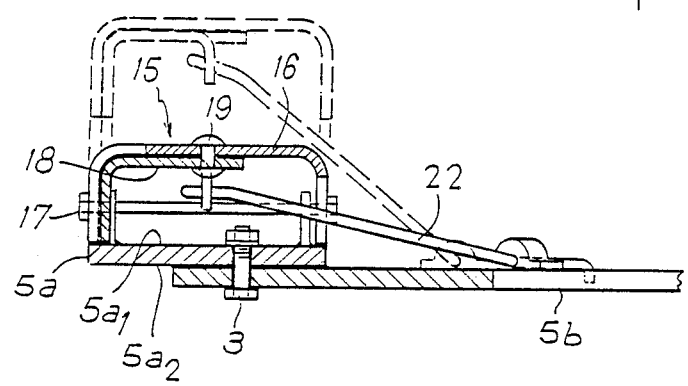
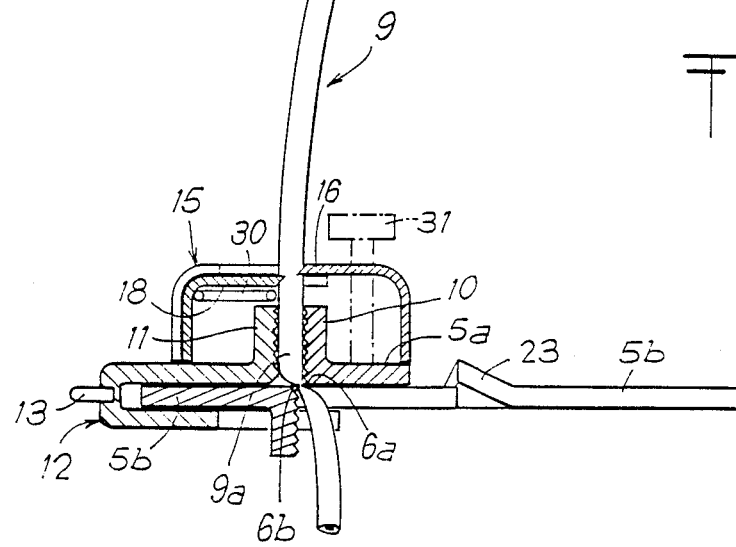

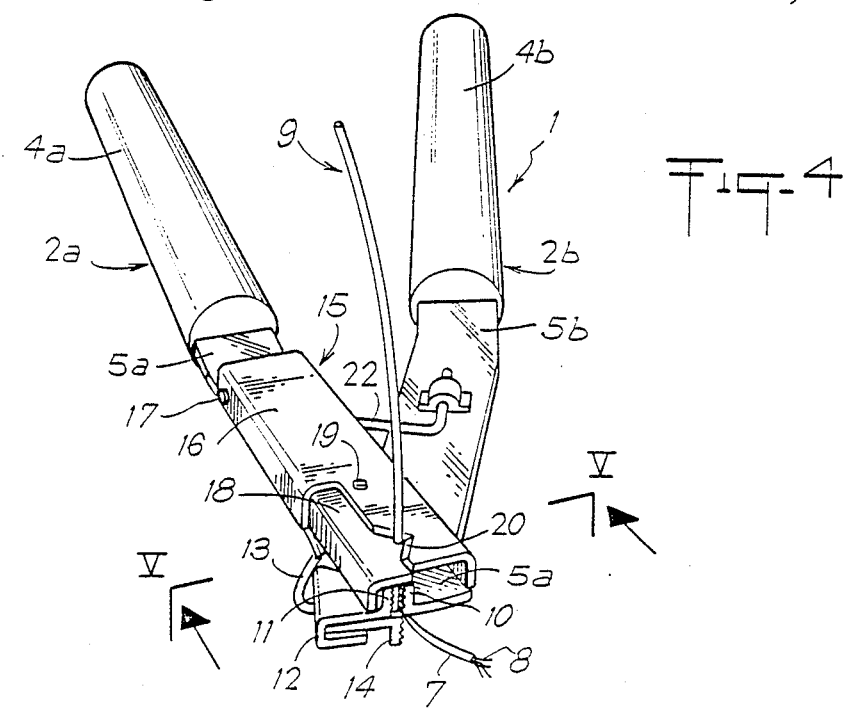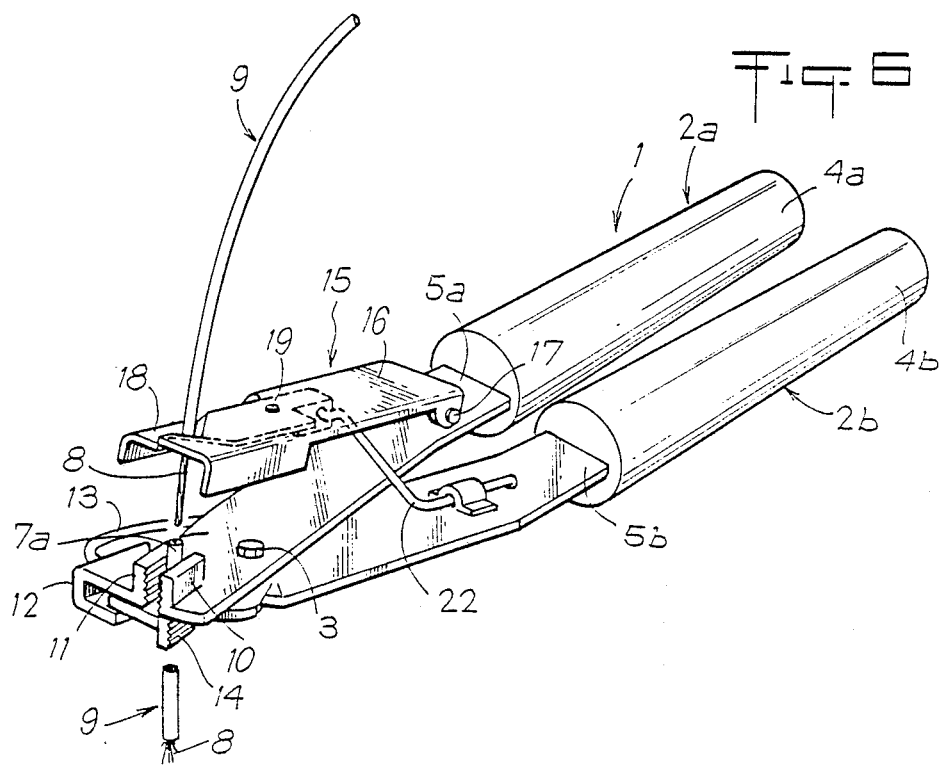

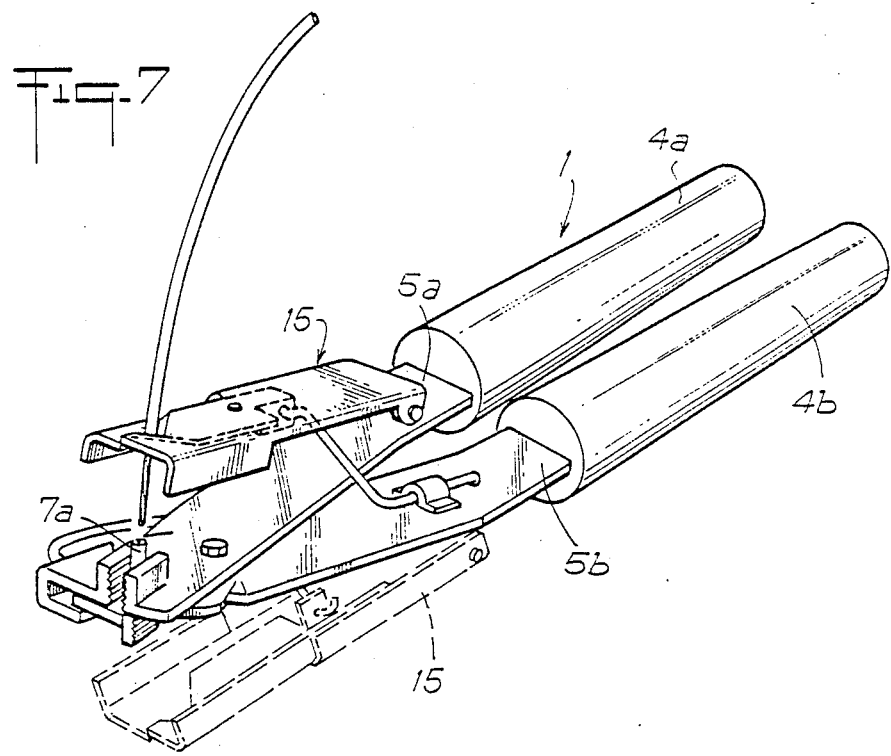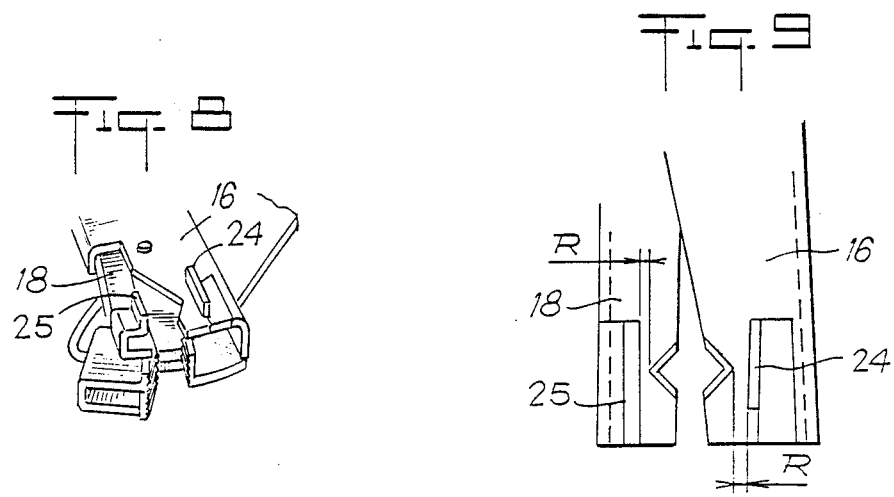

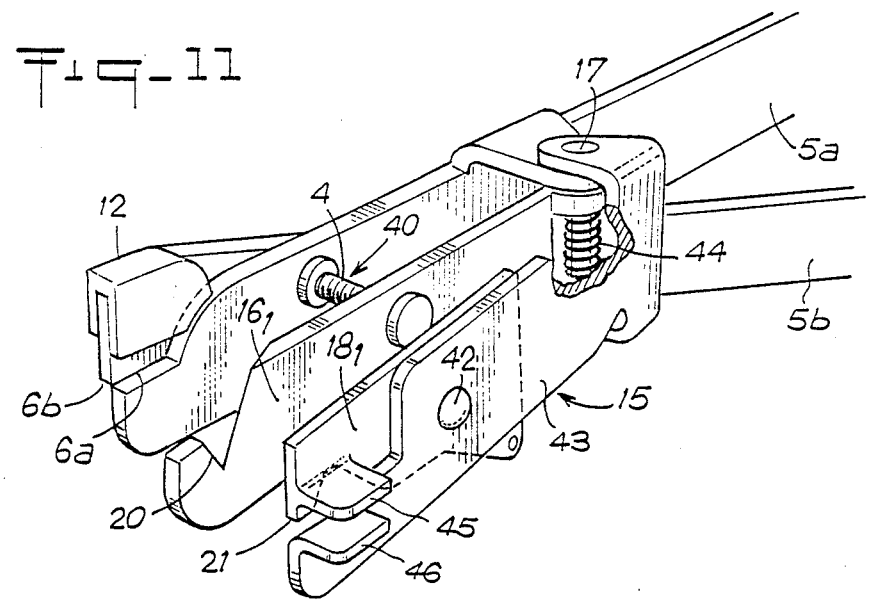

COMBINED TOOL FOR CUTTING AND STRIPPING THE ENDS OF ELECTRICAL WIRES COVERED WITH AN INSULATING SHEATH

FIELD OF THE INVENTION

The present invention relates to the technical domain of hand tools and, more particularly, to the tools used in the domain of electricity for cutting and stripping electrical wiring of supple or rigid character, single- or multi-strand, covered with an insulating sheath, generally made of plastics material

BACKGROUND OF THE INVENTION

The laying of current-transmitting cables between members for producing, consuming or shunting electrical energy, involves cutting these cables to length and stripping each of the terminal parts so as to facilitate electrical connection with the terminals provided to that end.

These two operations are carried out by means of tools of specific character, constituted by an independent wire cutter and by a wire stripper.

The wire cutter is in the form of shears, comprising two cutting edges located opposite each other and enabling the insulating covering and the wire to be cut simultaneously.

The wire stripper comprises two edges presenting opposite complementary notches defining a range of templates whose sections correspond to the standardized sections of the electrical wiring used.

Such a stripper is used by suitably choosing, within the range of templates, the calibre corresponding to the section of the electrical wire to be stripped. The cable is placed between the notches and the stripper is closed, cutting only the thickness of the insulating covering. By axial traction, the stripper then enables the cut covering part to be extracted by sliding, in order to strip the corresponding part of the electrical cable.

In an attempt to carry out cutting and stripping in one single operation, the prior art has proposed a combined tool comprising two articulated levers of which the useful ends are provided with two returns each presenting relatively mobile jaws which, after cutting, make it possible to slide the insulating covering with respect to the electrical wires. Such a combined tool is characterized in that its use involves holding the tool flat, substantially parallel to the wire, and maneuvering it so that the operator can observe and control the successive cutting and stripping phases.

It has proved that such an orientation of use is not ergonomic and requires that the operator holds his forearm, wrist and hand in such a position as rapidly to cause fatigue after repeated actions and, in particular, considerably to reduce the physical power of clamping which he may exert on the gripping handles for actuating the tool.

Furthermore, such a tool structure is also characterized by considerable dimensions in the working plane, which is incontestably detrimental during execution and, more particularly, when a cutting-stripping operation is to be carried out inside a switch cabinet for example.

Another drawback of the above tool lies in its relative complexity resulting from the different relatively mobile constituent members having to be employed, in the resultant fragility and in the cost price that such a structure involves.

It is an object of the present invention to overcome the above drawbacks by proposing a novel combined tool for cutting and stripping the ends of electrical wires covered with an insulating sheath.

The combined tool according to the invention is principally constituted so that the cutting and stripping action may be effected with an ordinary hand-hold similar to that of a wire cutter, in which the general plane of the tool is perpendicular to the wire to be cut and stripped.

The combined tool according to the invention is, furthermore, designed so as to be of relatively small dimensions, allowing practical use thereof even in small spaces where electrical connections have frequently to be made.

It is another object of the invention to propose a novel combined tool, of particularly robust and reliable design, capable of performing a certain service without failure in time.

A further object of the invention is to propose a combined tool which may allow cut and stripping of one end of a wire or possibly the two ends on either side of the cut effected.

Another object of the invention is to propose a combined tool which may be used for electrical wires of various sections, without requiring specific adjustment, as a function of the diameter of the electrical wire proper.

SUMMARY OF THE INVENTION

In order to attain the above objects, the combined tool according to the invention, of the type comprising a wire cutter constituted by two levers forming, on either side of a common pivot pin, two gripping and actuation handles and two blades presenting two opposite cutting edges constituting shears, is characterized in that:

at least one of the levers comprises, at its end and parallel to its cutting edge, a counter-jaw retractably mounted against the action of an elastic return member limiting pressure, behind the cutting edge of said blade, the second lever is associated laterally, on its outer face, with a tool for cutting and stripping the sheath of a cable, said tool comprising two jaws which are articulated on each other and on said lever, disposed laterally and externally and associated with a control member anchored on the second lever and adapted to provoke, during closure of the levers, firstly their own partial closure to cut the sheath then their lateral outward offset in order to extract the cable from the cut and gripped sheath part.

BRIEF DESCRIPTION OF THE DRAWINGS

The invention will be more readily understood on reading the following description with reference to the accompanying drawings, in which:

FIG. 1 is a perspective view illustrating the combined tool of the invention seen at an angle of appreciation corresponding to one of its faces.

FIG. 2 is a perspective view, similar to FIG. 1, but illustrating the tool on its second face.

FIG. 3 is a transverse section, on a larger scale, taken along plane III—III of FIG. 2.

FIG. 4 is a perspective view, similar to FIG. 2, but illustrating the tool in a first state of operation.

FIG. 5 is a transverse section, on a larger scale, taken along V—V of FIG. 4.

FIG. 6 is a perspective view illustrating, at a different angle, another phase of operation of the tool.

FIG. 7 is a perspective view similar to FIG. 6, showing a possible development of the object of the invention.

FIG. 8 is a partial perspective view, similar to FIG. 2, illustrating a development of the invention.

FIG. 9 is a plan view corresponding to FIG. 8 and showing a constructive characteristic.

FIG. 11 is a partial perspective view illustrating a variant embodiment.

FIG. 12 is a plan view explaining an operational state of the embodiment of FIG. 11.

FIG. 13 is a view in transverse section taken along line XIII—XIII of FIG. 12.

FIG. 14 is a plan view similar to FIG. 12 and showing another characteristic position.

FIG. 15 is a view in transverse section taken along line XV—XV of FIG. 14.

DETAILED DESCRIPTION OF THE DRAWINGS

Figure 10:
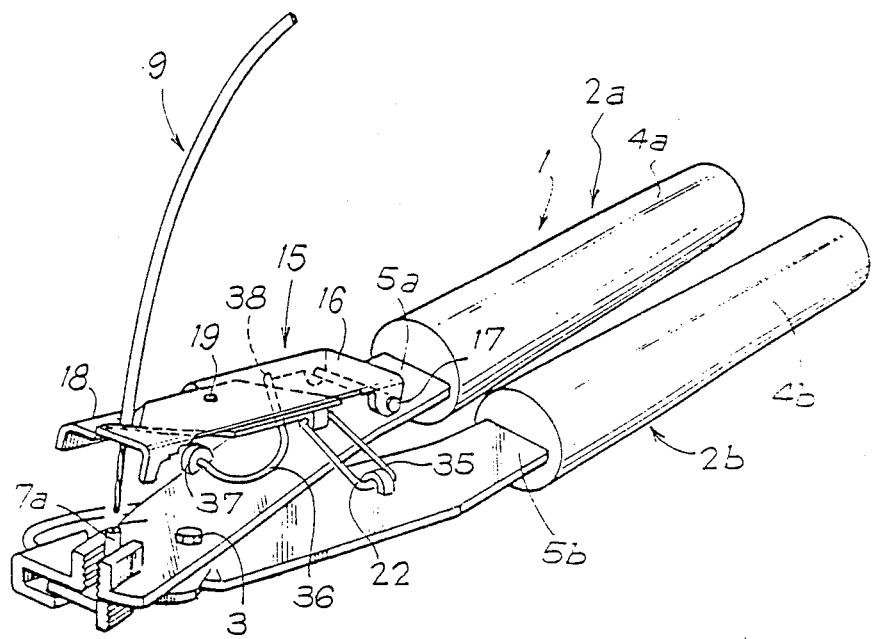
FIG. 10 is a view similar to FIG. 6, but showing a variant embodiment.

Referring now to the drawings, the combined tool according to the invention, as shown in FIGS. 1 to 3, firstly comprises a wire cutter 1 constituted by two levers 2a and 2b articulated on each other via a pivot pin 3. The levers 2 form, on either side of the pin 3, two handles 4a, 4b for gripping and actuation, and two blades 5a, 5b extending parallel and side by side. The blades 5a and 5b present, opposite and from their ends opposite the handles 4, two cutting edges 6a and 6b, preferably rectilinear. The edges 6a, 6b together constitute shears similar to a wire cutter, enabling both the insulating sheath 7 and the or each electrical wire 8 of a cable 9, to be cut at he same time.

According to the invention, one of the levers, such as lever 2a, comprises, at its end and parallel to its cutting edge 6a, a gripping jaw 10 extending perpendicularly to the plane of the blade 5a and from the outer face $5a_1$ thereof by opposition to face $5a_2$ qualified as inner due to its orientation opposite the blade 5b.

The gripping jaw 10 is arranged opposite a counter-jaw 11, for example, presented by a staple element 12 mounted so as to be slidable on the blade 5b, more particularly in a direction substantially perpendicular to the edge 6b. The staple element 12 is preferably made to overlap the edge of the blade 5b opposite the cutting edge 6b. The staple element 12 is associated with an elastic return member 13 anchored on the blade 5b and always urging this staple element in displacement in the direction for which the counter-jaw 11 extends beyond the cutting edge 6b or, at least, in the plane of the latter. The spring 13 constitutes both an elastic return member, as well as a pressure limiter allowing retraction of the counter-jaw 11 by relative slide of the staple element 12 on the blade 5b as soon as the gripping jaw 10 exerts, by gripping a cable 9 against the counter-jaw 11, an effort of pressure greater than the antagonistic action of the spring 13. The staple 12 is immobilized in a stable position under the action of the elastic member 13 by abutment against a stop 14 presented by the blade 5b. The stop 14 is preferably in the form of a jaw identical to jaw 10.

The counter-jaw 11 might also be made differently, for example by a blade fast with a leaf-type spring, folded or not, borne by the lever 2b and more particularly the blade 5b.

The lever 2a furthermore comprises, laterally and parallel to the outer face $5a_1$ of the blade 5a, an auxiliary or secondary tool 15 for cutting and stripping the sheath 7. The tool 15 comprises a first jaw 16 which is mounted on the blade 5a by a pivot pin 17 extending substantially perpendicularly to the cutting edge 6a. The pivot pin 17 is preferably disposed opposite the cutting blade 6a with respect to the pivot pin 3. The tool 15 comprises a second jaw 18 which is articulated on the first via a pivot 19. The jaws 16 and 18 present, on their opposite edges and between the pivot 19 and their free ends, two rebated cutting edges 20 and 21 made, in a first example, to allow a minimum section of passage corresponding for example to the smallest possible section which may be given to the wire 8, always to remain therebetween, in the state of closure of the tool 15. The jaws 16 and 18 are shaped to cover the jaw 10 and the counter-jaw 11, by presenting the edges 20 and 21 substantially in the transverse plane of these jaws.

The tool 15 is associated with a control member 22 interposed between the tool 15 and the second blade 5b, so as to provoke, during closure of the levers 2a and 2b, firstly the relative closure of the jaw 18 against the jaw 16, then the lateral offset by pivoting on pin 17 of the tool 15.

In one embodiment, the control member 22 is constituted by a spring, of the piano string type, anchored on the blade 5b on the one hand, and on the mobile jaw 18 on the other hand, in order to extend laterally to the branches 5a and 5b, as will be seen from an examination of FIGS. 2 and 3. The spring 22 is shaped so that, in the position of opening according to FIG. 2, the jaw 18 occupies a position of relative opening with respect to the jaw 16 maintained parallel to the blade 5a. The shaping of the spring 22 is also chosen so that it performs a function of opening of the levers 2a and 2b up to a maximum position, for example determined by a stop 23 borne by the blades, such as 5b, in order to be placed on the angular path of the blade 5a.

The combined tool described hereinabove operates as follows:

In the position of opening illustrated in FIGS. 1 and 2, an electrical cable such as 9 may be engaged by the rebated edges 20 and 21, between the jaws 16 and 18, in order also to traverse blades 5a and 5b.

In this state, closure of the cutter 1 by bringing the handles 4a and 4b together, firstly provokes closure of the blades 6a and 6b of which the jaw 10 and the counter-jaw 11 grip that part of the electrical cable traversing the stripping tool 15. As closure continues, the jaw 10 exerts an effort of pressure on the cable 9 which transmits it to the counter-jaw 11. The staple element 12 is thus urged into relative retraction by straining the return spring 13. The counter-jaw 11 is displaced in retreat with respect to edge 6b which comes into cooperation with the edge 6a in order to cut the terminal part of the cable 9, i.e. the sheath 7 and the wire 8 simultaneously.

This operational phase, illustrated in FIGS. 4 and 5, shows that the cutting and stripping tool 15 always occupies its position parallel to its outer face $5a_1$ of the blade 5a.

The stroke of closure of the cutter 1, as described hereinabove, has for its effect to displace the spring 22 relatively which is progressively strained in order to provoke, simultaneously, the progressive closure of the jaw 18 with respect to jaw 16. The rebated edges 20 and 21 thus grip the part of the cable traversing the tool 15 and effect, at the end of closure stroke, cut of the sheath 7 only. As shown in FIG. 5, such cut is effected beyond the terminal part of the cable 9 gripped by the jaw 10 and the counter-jaw 11, being given that jaws 16 and 18 extend parallel and outside jaw 10 and counter-jaw 11. At the end of closure stroke, the jaw 18 is in abutment against jaw 16, with the result that the closure of the levers 2a and 2b provokes, via spring 22, an outward pivoting of the tool 15 which is thus offset outwardly, as shown in FIGS. 3 and 6. The offset of tool 15, by pivoting on pin 17, enables jaws 16 and 18 to abut on the cut sheath 7 and to drive in the direction of arrow $f_1$ the cable 9 whose wire 8 is extracted by sliding the segment of sheath 7a gripped between the jaw 10 and counter-jaw 11.

The stroke of opening of the cutter 1 provokes the relative opening of the jaws 16 and 18 releasing the cable 9 presenting a terminal part formed by the stripped wire 8.

Opening of the cutter 1 causes the blades 5a and 5b to move apart and the staple element 12 to return into its original position The counter-jaw 11 maintains the segment of sheath 7a against the jaw 10 and ensures translation thereof to return it into the plane of the edges 6a and 6b allowing ejection thereof upon complete opening.

As seen from the foregoing, the combined tool according to the invention comprises a cutter 1 acting in the conventional manner of cutters, i.e. capable of effecting a shearing action whilst being presented so that the general plane of the cutting blades is placed perpendicularly to the cable to be cut.

Furthermore, the cutting and stripping tool 15 is borne parallel and outside one of the blades, being constituted by two jaws capable of pivoting relatively. This tool 15 is furthermore articulated on a pin 17 perpendicular to the cutting edge of the bearing blade, with the result that operation of the stripping tool 15 involves an action of cut of the sheath effected still holding the tool in the same direction and acting on the handles in conventional manner for conducting an action of cut by closure. The stripping phase occurs by proceeding in the same manner, since the offset is produced at the end of stroke of closure.

In this way, the operator may carry out an operation of cutting and stripping by presenting the combined tool in conventional manner with respect to cable 9 on which it may exert an action of gripping and cutting in a movement and posture which are particularly ergonomic, enabling the maximum physical power to be employed.

It should be noted that the relatively small dimensions of the combined tool makes it possible to carry out such a cutting-stripping operation inside a switch cabinet or cupboard, whilst avoiding dropping thereinside the segment 7a which may be extracted, after the cutting-stripping operation, by being held between the jaw 10 and the counter-jaw 11 by the operator controlling by hand the stroke of opening of the tool under the action of spring 22.

An examination of FIGS. 1 to 6 shows, moreover, that the combined tool is formed by simple and robust constituent or structural elements, which are able to perform a service, particularly long-lasting and reliable in time, without specific maintenance.

FIG. 7 shows that the combined tool according to the invention may be such as to provide each of the levers 2a and 2b with the same constituent members as those described hereinbefore. In such a case, it then becomes possible to cut a cable, obtaining stripping of the two cut terminal parts simultaneously.

FIGS. 8 and 9 show a variant embodiment in which each of the jaws 16 and 18 of the tool 15 are provided, on the outside and level with the rebated cutting edges 20 and 21, with a stop 24 and 25 which stands back by a small measure R with respect to the bottom of the rebated edges 20 and 21. In this way, the stroke of closure of the jaw 18 is limited by the gripping of the sheath 7 between the stops 24 and 25, with the result that the action of cutting of the edges 20 and 21 is reduced to the measure R chosen to be substantially equivalent to the thickness of the sheath 7.

Although this has not been shown, it may be provided to arrange the stops 24 and 25 so as to render the amount R adjustable.

FIG. 5 shows that it may be provided to arrange, inside the mobile jaw 18, an ejector spring 30 placed under strain during the cutting and stripping phase and which is released during the phase of offset of the tool 15. In this way, during the stroke of reopening of the combined tool, the spring 30 reoccupies its original position and contributes, upon the return of the tool 15 into its position in alignment with the blade 5a, to ejecting the segment of sheath 7a released by the relative opening of the jaw 10.

FIG. 5 also shows that it is possible to provide the tool 15, particularly the jaw 16, with a screw 31 for adjusting the spacing of the tool 15 in position of return on the blade 5a. This screw makes it possible to adjust the length of the segment of sheath to be stripped.

FIG. 10 shows a variant embodiment in which the control member 22 is constituted by a small rod 35 pivotally mounted between the blade 5b and the jaw 18 of the tool 15. The member 22 comprises, in addition, a spring 36 of the kick-over type anchored at 37 on the blade 5a and at 38 on the jaw 18. The rod 35 and the spring 36 are arranged to define a point of tipping for the closure and opening in offset of the tool 15. This point of tipping makes available for the tool 15 a somewhat delayed return stroke, in order to ensure opening of the jaws before the return of the tool 15 to allow ejection, particularly by the spring 30, of the segment of sheath stripped and retained between the jaws 10 and 11 before the return of the stripped part of the wire.

FIG. 11 shows a preferred variant embodiment following from the embodiment of FIG. 10 and provided to give the tool a possibility of prior adjustment of the terminal part 9 of cable to be stripped, more practical than the one set forth with reference to FIG. 5.

The variant of FIG. 11 comprises the same constituent elements as those described with reference to the preceding Figures and, more particularly, to FIG. 10, apart from the auxiliary or secondary tool 15 for cutting and stripping the sheath 7.

In this embodiment, the tool 15 comprises a first jaw $16_1$ which is mounted on the pin 17 whilst being fixed to the blade 5a by a device 40 for adjusting distance. Such a device 40 may be formed, in particular, by a screw 41 mounted in a tapping in blade 5a and comprising an end which is immobilized axially but free to rotate in the jaw $16_1$. In such a case, the screw 41 may be maneuvered from that face of the blade 5a opposite the tool 15. In equivalent manner, it may be provided to adopt a reverse assembly to perform the same function which is that of allowing an adjustment of distance between the blade 5a and the jaw 16 which, in the assembly according to this variant, is disconnected from the jaw 18, in accordance with the arrangement of FIG. 10.

The tool 15 comprises a second jaw $18_1$ complementary to jaw $16_1$ concerning the rebated cutting edges 20 and 21 identical to those described previously. The jaw $18_1$ is pivotally mounted via a pivot 42 on a lateral plate 43 articulated on pin 17. The jaw $18_1$ is disposed against the inner face of the plate which is urged by an elastic member 44, for example threaded on the pin 17, in order always to apply jaw $18_1$ against jaw $16_1$, whatever the adjustment of distance of the latter with respect to the blade 5a. Jaw $18_1$ comprises, projecting on its outer face and standing back from the edge 21, a jaw 45 extending parallel to a counter-jaw 46 borne by the plate 43. In this embodiment, the control member 22, preferably of the connecting rod type according to FIG. 10, is interposed between blade 5b and jaw $18_1$. In this embodiment, the wire cutter 1 has no jaw 10 nor counter jaw 11.

The variant embodiment described hereinabove operates as follows:

The electrical cable 9 is engaged as stated hereinabove in order either to come into abutment against the blades 5a and 5b, or to traverse the latter, open, if the terminal part must be cut.

The handles are then maneuvered in order to close blades 5a and 5b, with a view possibly to ensuring cut of the sheath 7 and of the wire 8, and to close the tool 15 by pivoting the jaw $18_1$ on the plate 43 with slide against jaw $16_1$. FIGS. 12 and 13 show that the closure of the tool 15 is translated by a penetration of the edges 20 and 21 in the sheath 7 with, simultaneously, a gripping of the cable 9 located outside the tool by jaw 45 and counter-jaw 46. FIG. 13 demonstrates that the edges notch the sheath 7 at a distance d from blades 5, distance d corresponding to the adjustment of distance given by device 40.

From this position in which, in all cases, the cable 9 is in abutment against the blades 5, the closing maneuver of the handles 4a and 4b is translated, via the control member 22, by a pivoting for opening in the direction of arrow $f_1$ of the plate 43 as shown in FIGS. 14 and 15. The immobile jaw $16_1$ constitutes a stop opposing the recoil of that sheath part 7′ included between itself and the blades 5a–5b. On the other hand, plate 43, in its lateral pivoting, takes along the cable 9 gripped between the jaw 45 and counter-jaw 46. The sheath 7, although it has not been completely cut by the jaws $16_1$ and $18_1$, is torn, with the result that the wire 8 may slide inside the sheath part 7′.

At the end of opening stroke, the cable 9, still retained between jaw 45 and counter-jaw 46, then presents a terminal part stripped over an axial measurement equal to d.

The invention is not limited to the embodiments described and shown, as various modifications may be made thereto without departing from its scope.

What is claimed is:

1. In a combined tool for cutting and stripping the ends of electrical cables covered with an insulating sheath, of the type comprising a wire cutter constituted by two levers forming, on either side of a common pivot pin, two gripping and actuation handles and two blades presenting two opposite cutting edges constituting shears, at least one of the levers comprises, at its end and parallel to its cutting edge, a counter-jaw retractably mounted against the action of an elastic return member limiting pressure, behind the cutting edge of said blade, the second lever is associated, laterally, on its outer face, with a tool for cutting and stripping the sheath of a cable, said tool comprising two jaws which are articulated on each other and on said lever, disposed laterally and externally and associated with a control member anchored on the second lever and adapted to provoke, during closure of the levers, firstly their own partial closure to cut the sheath then their lateral outward offset in order to extract the cable from the cut and gripped sheath part.

2. The combined tool of claim 1, wherein the cutting and stripping tool is mounted on the outer face of the lever by a pivot pin perpendicular to the cutting edge of the blade of said lever.

3. The combined tool of claim 2, wherein the pivot pin is located beyond the common pivot for articulation with respect to the cutting edge.

4. The combined tool of claim 1, wherein the jaws of the cutting and stripping tool comprise opposite rebated cutting edges.

5. The combined tool of claim 1, wherein the cutting and stripping tool comprises:
a first jaw mounted by a pivot pin on the lever,
a second jaw articulated on the first by a pivot,
a control member anchored on the second lever and on the second jaw and urging, in position of opening of the levers of the tool, the first jaw into alignment with the lever bearing it and the second jaw into opening with respect to the first.

6. The combined tool of claim 4 or 5, wherein the jaws of the stripping tool comprise cutting edges bordered by stripping stops offset with respect to these stops.

7. The combined tool of claim 1, wherein the elastic return member holds the counter-jaw, in a non-retracted state, against a stop of the second lever.

8. The combined tool of claim 5, wherein the first jaw of the cutting and stripping tool comprises an ejector spring adapted to be placed under strain by the second jaw during closure of said tool.

9. The combined tool of claim 5, wherein the control member is constituted by a spring.

10. The combined tool of claim 1, wherein the control member is constituted by a small rod articulated between one blade and jaw of the tool and by a spring anchored between the other blade and jaw of the tool, the rod and the spring being arranged to define a point of tipping between the position applied and the offset position of the tool.

11. The combined tool of claim 1, wherein the jaw bears a screw for adjusting the length of the cable to be stripped.

12. The combined tool of claim 1, wherein the tool comprises:
a first jaw mounted on a pin and fixed to the blade by a device for adjusting distance,
a second jaw connected to the control member and pivotally mounted by a pivot on a lateral plate mounted on the pin and subjected to the action of a spring causing it to pivot in the direction where the second jaw is applied against the first jaw.

13. The combined tool of claim 12, wherein the jaw comprises, standing back from its cutting edge, a jaw extending parallel to a counter-jaw borne by the plate.

* * * * *